(12) United States Patent
Neil et al.

(10) Patent No.: US 8,219,970 B2
(45) Date of Patent: *Jul. 10, 2012

(54) XML PUSH AND REMOTE EXECUTION OF A WIRELESS APPLICATIONS

(75) Inventors: Tim Neil, Mississauga (CA); Dave Burgess, Markham (CA); Viera Bibr, Kilbride (CA)

(73) Assignee: Research In Motion Limited, Waterloo, Ontario (CA)

( * ) Notice: Subject to any disclaimer, the term of this patent is extended or adjusted under 35 U.S.C. 154(b) by 1098 days.

This patent is subject to a terminal disclaimer.

(21) Appl. No.: 12/117,395

(22) Filed: May 8, 2008

(65) Prior Publication Data

US 2008/0282223 A1 Nov. 13, 2008

Related U.S. Application Data

(60) Provisional application No. 60/916,613, filed on May 8, 2007.

(51) Int. Cl.
*G06F 9/44* (2006.01)

(52) U.S. Cl. ......... 717/107; 717/170; 717/172; 719/313

(58) Field of Classification Search .................. 717/107, 717/170, 172; 719/313
See application file for complete search history.

(56) References Cited

U.S. PATENT DOCUMENTS

| | | | |
|---|---|---|---|
| 6,066,181 A | 5/2000 | DeMaster | |
| 7,010,796 B1 | 3/2006 | Strom et al. | |
| 7,533,365 B1 * | 5/2009 | Hogstrom et al. | 717/105 |
| 2004/0199665 A1 | 10/2004 | Omar et al. | |
| 2005/0160399 A1 | 7/2005 | Kumar et al. | |
| 2006/0080683 A1 | 4/2006 | Anwar et al. | |
| 2006/0236306 A1 * | 10/2006 | DeBruin et al. | 717/113 |
| 2006/0239276 A1 | 10/2006 | Rodbarry et al. | |
| 2006/0251029 A1 * | 11/2006 | Fritsch et al. | 370/338 |
| 2006/0253834 A1 * | 11/2006 | Cacenco et al. | 717/107 |
| 2007/0198968 A1 * | 8/2007 | Shenfield et al. | 717/104 |

OTHER PUBLICATIONS

Microsoft, "Visual J# Product Announcement" (Jan. 10, 2007) [retrieved from http://msdn.microsoft.com/en-us/vjsharp/ on Jun. 28, 2011].*

ECMA International, "Standard ECMA-335: Common Lnaguage Infrastructure (CLI) Partitions I to VI", 4th ed. (Jun. 2006) [retrieved from http://www.ecma-international.org/publications/files/ECMA-ST/Ecma-335.pdf on Jun. 28, 2011].*

Champlain, M.; Patrick, B., "C# 2.0 Practical Guide for Programmers" (2005), Morgan Kaufmann Publishers, pp. 1-5, 9-15, 150-154, 211-223.*

(Continued)

*Primary Examiner* — Andy Ho
*Assistant Examiner* — Brian Wathen
(74) *Attorney, Agent, or Firm* — Gowling Lafleur Henderson LLP

(57) ABSTRACT

A method is provided for facilitating generation of a server-side application capable of calling a function of a wireless application on a mobile device. A structured data file defining the wireless application is retrieved. The structured data file is parsed for identifying exposed functions. Code stubs are generated for each of the exposed functions. The code stubs are configured to be included as part of the server-side application and to define a message to be transmitted to the wireless application upon execution of the code stub.

3 Claims, 5 Drawing Sheets

OTHER PUBLICATIONS

Extended European Search Report issued by the European Patent Office dated Jul. 14, 2010 for corresponding European Patent Application No. 08748286.5.

Sun Microsystems: "Java RMI Tutorial, Revision 1.3", Feb. 10, 1997; Retrieved from the Internet: URL:///www.metz.supelec.fr/metz/personnel/vialle/cpurse/SI/java-rmi/doc-JavaRMI.pdf; XP002461278.

William Grosso; "Chapter 4: The Same Server, Written Using RMI"; Java RMI; Oct. 22, 2001, O'Reilly Media; XP002589431.

William Grosso; "Chapter 22: HTTP Tunneling" Java RMI; Oct. 22, 2001; O'Reilly; XP002589432.

International Search Report issued by the Canadian Intellectual Property Office dated Aug. 14, 2008 for corresponding International Patent Application No. PCT/CA2008/000887.

Written Opinion of the International Searching Authority issued by the Canadian Intellectual Property Office dated Aug. 14, 2008 for corresponding International Patent Application No. PCT/CA2008/000887.

* cited by examiner

XML PUSH AND REMOTE EXECUTION OF A WIRELESS APPLICATIONS

The present invention relates generally to wireless applications and a system and method for pushing data to the wireless application for remote execution thereof. The present application claims priority from U.S. Provisional Application No. 60/916,613 filed May 8, 2007.

BACKGROUND

There are continually increasing number of mobile communication devices in use today, including, for example, smart phones, personal digital assistants (PDAs) with wireless capabilities, personal computers, self-service kiosks and two-way pagers. Accordingly, software applications are being developed to execute on these devices and increase their utility. For example, a smart phone may include an application which retrieves the weather for a range of cities, or a PDA which may include an application that allows a user to shop for groceries. Such software applications take advantage of connectivity to a communication network in order to provide timely and useful services to users of the communication devices.

However, due to limited resources of many devices, as well as the complexity and expense required to deliver large amounts of data to the devices, developing and maintaining software applications tailored for a variety of devices remains a difficult and time-consuming task.

Further, with the proliferation of wireless communication devices, there is an increased demand to quickly and easily develop client applications that support access to one or more backend servers. Therefore, it is often the case that the application is developed independently of the required interface to the backend server.

Accordingly, component applications (also referred to as wireless applications herein) and methods for developing and implementing such applications have been introduced. Details regarding component application can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Based Wireless Applications" and published as WO2004059939, each of which is assigned to the owner of the present application.

In order for a user of a mobile device executing a wireless application to receive data in the form of notifications, the user subscribes to a data source using protocols such as WS-Eventing. Data can then be pushed to the mobile device. However, WS-Eventing is a relatively "chatty" protocol which can consume significant bandwidth for a wireless application.

Accordingly, an improved method for pushing data to a device is desired. Further, a simple method for designing server-side applications to exploit the improved method is also desired.

BRIEF DESCRIPTION OF THE DRAWINGS

Embodiments will be described by way of example only with reference to the following drawings in which.

DETAILED DESCRIPTION OF THE PREFERRED EMBODIMENTS

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

In accordance with one embodiment, there is provided a method for facilitating generation of a server-side application capable of calling a function of a wireless application on a mobile device. The method comprises: at step 502, retrieving a structured data file defining the wireless application; at step 504, parsing the structured data file for identifying exposed functions; at step 506, generating code stubs for each of the exposed functions, the code stubs configured to be included as part of the server-side application and to define a message to be transmitted to the wireless application upon execution of the code stub; at step 508, generating a namespace in which to hold the code stubs; and at step 510, creating a class for the server-side application including all of the exposed functions. A computer readable medium comprising instructions configured to execute the above method is also provided.

Figure 1:
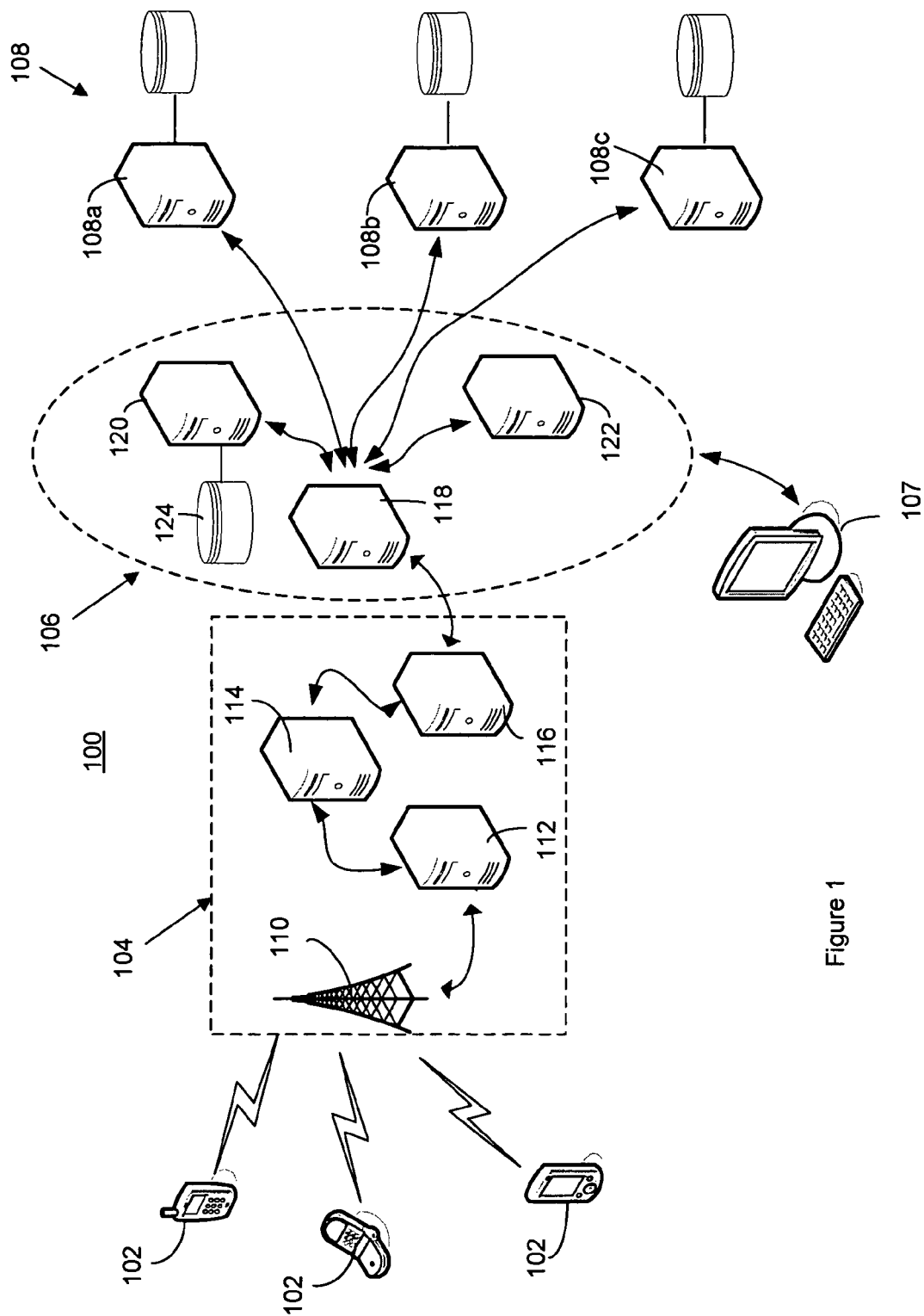
FIG. 1 is a block diagram of a communication network infrastructure.

For convenience, like numerals in the description refer to like structures in the drawings. Referring to FIG. 1, a communication network infrastructure is illustrated generally by numeral 100. The communication infrastructure 100 comprises a plurality of communication devices 102, or simply devices 102, a communication network 104, an application gateway 106 and a plurality of data-sources 108.

The devices 102 may include both wired and wireless computing devices such as a desktop computer, a notebook or other portable computer, a smart phone, a personal digital assistant (PDA), and the like. The devices 102 are in communication with the application gateway 106 via the communication network 104. Accordingly, the communication network 104 may include several components such as a wireless network 110, a relay 112, a corporate server 114 and/or a mobile data server 116 for relaying data between the devices 102 and the application gateway 106.

The application gateway 106 comprises a gateway server 118, a provisioning server 120, a discovery server 122 and a repository 124. The gateway server 118 is in communication with both the provisioning server 120 and the discovery server 122. The gateway server 110 is further in communication with a plurality of the data-sources 108, such as Web services 108a, database services 108b, as well as other enterprise services 108c, via a suitable link. For example, the gateway server 110 is connected with the Web services 108a and database services 108b via Simple Object Access Protocol (SOAP) and Java Database Connectivity (JDBC) respectively. Other types of data-sources 108 and their corresponding links will be apparent to a person of ordinary skill in the art. Accordingly, it can be seen that the gateway server 118 acts as a message broker between the devices 102 and the data-sources 108.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Applications are provided for execution on the wireless devices 102. The applications are stored in a repository 124 as a series of packages, or bundles. The packages are typically created by an application developer using a wireless application design tool provided in an wireless application development environment 107. The wireless application design tool provides support for a drag-and-drop graphical approach for visual design of application components including screens, data elements, messages and application workflow logic, as described in the previously referenced documents.

The application packages are represented as structured data, such as Extensible Mark-up Language (XML), that can be generated automatically by the design tool through an automatic code generation process. The design tool further enables the automatically-generated code to include, or be otherwise augmented by, an industry standard scripting language, such as JavaScript or another scripting/programming language known in the art.

The availability of application packages in the repository 124 is published in a registry via a discovery service provided by the discovery server 122. It is recognized that there can be more than one repository 124 and associated registries used by the gateway server 118.

Once again, the design tool is operated in an application development environment 107 executing on a computer. The development methodology of the design tool can be based on a visual "drag and drop" system of building application models.

The design tool can be structured as a set of plug-ins to a generic integrated design environment (IDE) framework such as, for example, the Eclipse™ framework. Alternatively, the tool can be configured as a complete design framework without using a plug-in architecture.

In many cases, a developer of server-side application has a priori knowledge of the devices to which information has to be pushed. For such cases, requiring the mobile device user to subscribe to the server-side application using protocols such as WS Eventing can waste a significant amount of bandwidth due to the overhead involved in the protocols. Accordingly, a method has been developed for pushing messages to the mobile device 102 without requiring subscription by the user.

Figure 2:
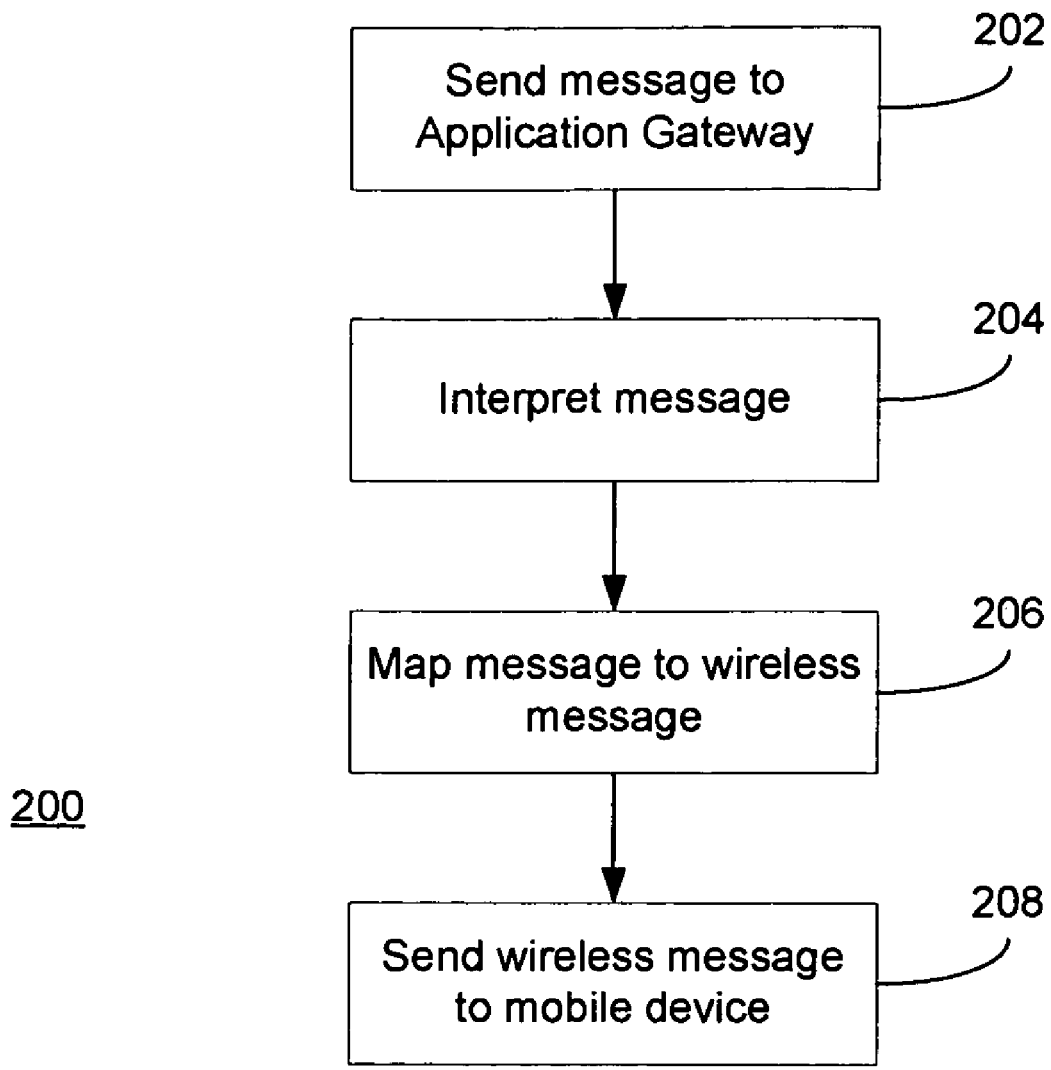
FIG. 2 is flow chart illustrating the operation of an XML push.

In order to facilitate a message push to the mobile device, the application gateway 106 is configured to process the HTTP POST request method. The HTTP POST method is well known in the art. Referring to FIG. 2, a flow chart illustrating the use of the HTTP POST method in the present embodiment to push data is represented by numeral 200. In step 202, the server-side application sends the message to the mobile device 102 via the application gateway 106 using HTTP POST.

In step 204, the application gateway 106 interprets the HTTP POST message to determine the destination device (or devices) as well as the content of the message. In step 206, the content of the message is mapped to its corresponding wireless application message parts as defined by a mapping file. A mapping file maps parts of an incoming message in a received format to their corresponding parts in a transmission format for subsequent transmission to the wireless application executing on the mobile device. In step 208, a wireless message is sent to the mobile device 102.

Further, in accordance with the following description, push integration is provided in an application development environment for developing server-side applications. The push integration facilitates development of a server-side application capable of executing a script method running on a mobile device, as described below.

To facilitate the push integration, the wireless application development environment 107 for developing wireless applications is modified. Specifically, the wireless application development environment is modified to include the ability to define a script method in a wireless application as "exposed" via a code attribute. As will be described in greater detail, code attributes are portions of code used by a developer of the wireless application to indicate that a script is to be exposed in such a manner that the it can be called by a server-side application.

At compile time, the wireless application is generated as is known in the art with several new features, described as follows. One or more messages are generated and added to the wireless application description to facilitate communication with the exposed script method. An auxiliary mapping file is also created that maps parts of an incoming message in a received format to their corresponding parts in a transmission format for subsequent transmission to the wireless application executing on the mobile device. Alternatively, the mapping information may be incorporated into a primary mapping file. Lastly, a script code stub is generated and incorporated into the wireless application. Specifically, the script code stub links the generated message with its corresponding exposed script method. That is, upon receipt of the incoming message the script code stub is executed, which in turn calls the corresponding exposed script method. The code attributes used to define the exposed script methods can then be removed for publication.

Corresponding changes are made in the development environment for the server side application. A Wireless Reference menu option is integrated into a context menu of the development environment for facilitating addition of a push reference to a project. If the developer selects the Wireless Reference menu option, a code stub is generated comprising invocation of code to push the message to the wireless application executing on the device. The generated code stubs are collected in a file and added to the projects with necessary references. This feature allows enhanced data push experience with wireless applications.

Therefore, during execution, the server-side application invokes a method which pushes a message to the application gateway using the HTTP POST method. At the application gateway, the received message is mapped to its corresponding wireless message parts. The wireless message is sent to the mobile devices 102 specified in the message received from the server-side application. Upon receipt of the wireless message, a corresponding script code stub is invoked, which, in turn, invokes the target exposed script method.

More details regarding the method describe above are provided as follows.

Building Wireless Application

As described above, the developer of a wireless application can identify script methods, or functions, to expose using code attributes. Accordingly, the concept of code attributes will be added to the script language parser. The code attributes will be able to be placed on a function to specify that the function is an exposed script method to which the server could push content.

Example of code attributes for the exposed function include [DeviceMethod], [DialogAlert], [RibbonAlert] and [DeviceMethodOptions]. The code attributes will include constructor parameters if the function includes parameters. As is known in the art, a constructor is a special method for initializing a new instance of a class. The term is used is reference to the initialization of the exposed function for the server-side application, as will be described in detail.

[DeviceMethod]. Each parameter specified in the function has an associated parameter specified in the [DeviceMethod] constructor. The parameter names and orders specified in the function are the same in the [DeviceMethod] constructor. Each parameter specified in the [DeviceMethod] constructor is a valid type in the wireless application. This type could also be an array. Sample syntax for a [DeviceMethod] code attribute is as follows:

```
[DeviceMethod(id = integer, customer = Customer)]
function DoMyMethod(id, customer)
{
    .....
}
[DeviceMethod(id = integer, customers = Customer[ ])]
function DoMyMethod(id, customers)
{
    .....
}
[DeviceMethod( )]
function DoMyMethod( )
{
    .....
}
[DeviceMethod]
function DoMyMethod( )
{
    .....
}
```

[DialogAlert] and [RibbonAlert]. These two alert code attributes can also be assigned to a function if the function has a [DeviceMethod] code attribute. The alert code attributes can be used by themselves or in combination with each.

A [DialogAlert] code attribute can have a string passed into its constructor. This string will be displayed in a dialog box when the message arrives at the mobile device 102. If no string is specified, a dialog box will still appear when the message arrives at the device 102, but it will not have a detailed message.

A [RibbonAlert] code attribute has a constructor that does not accept any parameters to it. It is simply an empty constructor. When the message arrives at the device it will cause a ribbon update for the wireless application. Sample syntax for [DialogAlert] and [RibbonAlert] code attributes are as follows:

```
[DeviceMethod(message = string)]
```

```
[DialogAlert("this is my dialog text")]
function HandleMessage(message)
{
    .....
}
[DeviceMethod(message = string)]
[DialogAlert]
function HandleMessage(message)
{
    .....
}
[DeviceMethod(message = string)]
[RibbonAlert]
function HandleMessage(message)
{
    .....
}
```

[DeviceMethodOptions]. This code attribute can also be put on a function as long as the function also has a [DeviceMethod] code attribute. In the present embodiment, the [DeviceMethodOptions] attribute is used to specify whether or not the message should be "end-to-end" secure and/or if the push mechanism should keep the last pushed message. This feature allows the push message to follow some of the same features as a WS_EVENTING push.

The [DeviceMethodOptions] code attribute contains at least one of the following constructor parameters: EndToEndSecure=true/false; and/or KeepLast=true/false. These Boolean properties default to be false unless otherwise specified. However the developer can explicitly specify that they are false. Sample syntax for the [DeviceMethodOptions] code attribute is as follows:

```
[DeviceMethod(message = string)]
[DeviceMethodOptions (EndToEndSecure = true)]
function HandleMessage(message)
{
    .....
}
[DeviceMethod(message = string)]
[DeviceMethodOptions (EndToEndSecure = true, KeepLast = false)]
function HandleMessage(message)
{
    .....
}
[DeviceMethod(message = string)]
[DeviceMethodOptions (KeepLast = true)]
function HandleMessage(message)
{
    .....
}
```

The syntax used for defining code attributes allows code attributes to be grouped together or declared separately for the function. In the present embodiment, the order in which the attributes are declared or grouped is not of consequence. Below are examples of combinations for defining code attributes:

```
[DeviceMethod]
[RibbonAlert( )]
[DialogAlert]
[DeviceMethod, RibbonAlert]
[DialogAlert, DeviceMethodOptions(KeepLast = true)]
[DeviceMethod( )]
[RibbonAlert, DialogAlert]
[DeviceMethodOptions(KeepLast = true)]
```

Figure 3:
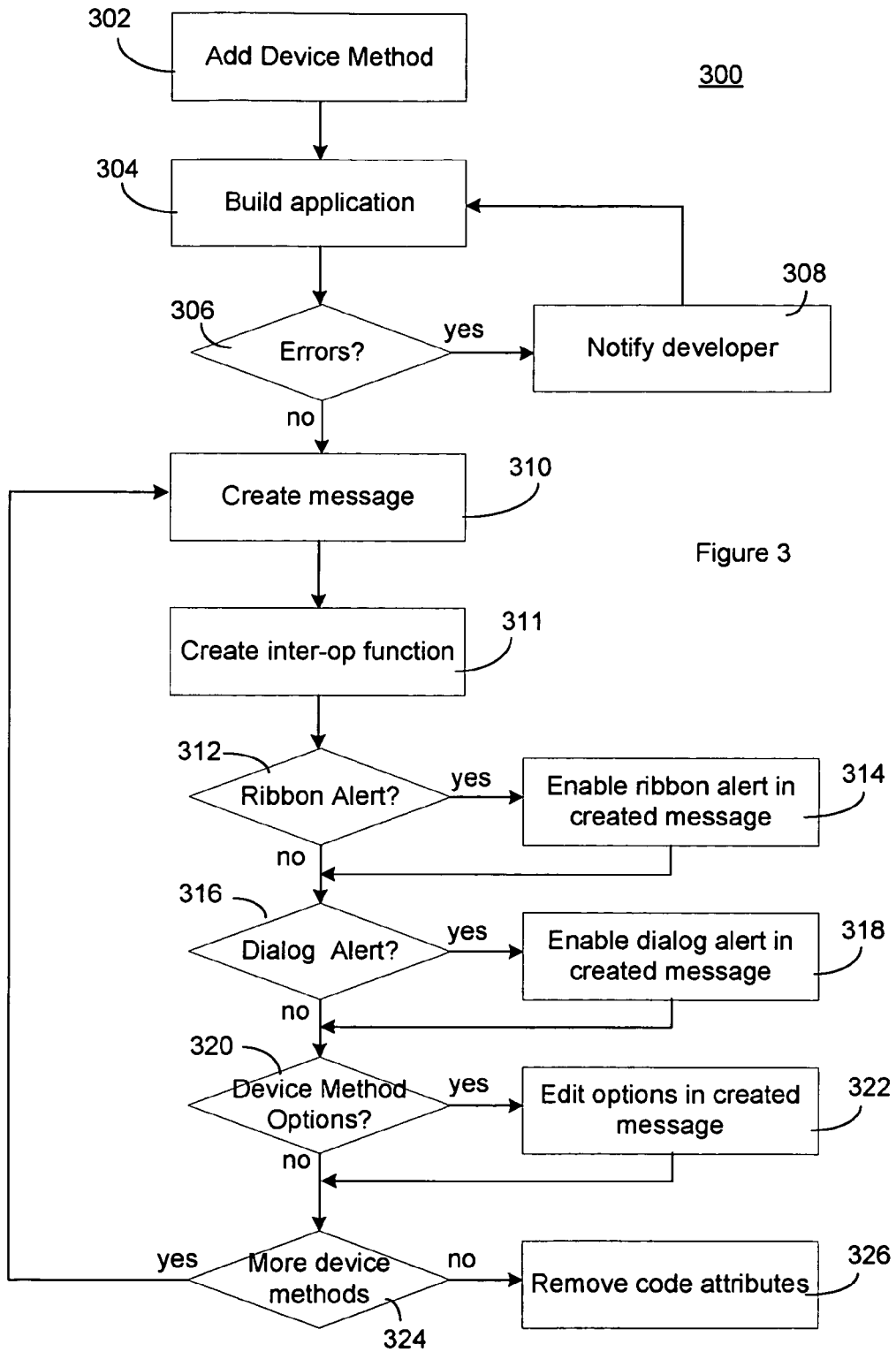
FIG. 3 is a flow chart illustrating the generation of the required components for facilitating a message push to a wireless application.

Referring to FIG. 3, a flow chart illustrating the process of adding a [DeviceMethod] code attribute to wireless application is shown generally by numeral 300. Since the [DeviceMethod] code attribute does not require a [RibbonAlert] or a [DialogAlert] code attribute, if neither code attribute is supplied, no alert will be assigned to the associated response method.

In step 302 the developer adds the [DeviceMethod] code attribute to a function in the wireless application. The [DeviceMethod] constructor parameters match the number and name of parameters in the function definition. In step 304, once the developer has completed the wireless application, the developer selects a "build" option for the wireless application.

In step 306, the wireless application development environment determines if there are any errors in the wireless application. Errors may include, for example, improperly defined code attributes, as discussed above. If an error is detected, in step 308 the user is advised of the error and given the opportunity to return to the design tool to correct the error.

If no error is detected, the wireless application is built by the wireless application development environment. In step 310, if a function is determined to have any of the code attributes, a message definition is created in the wireless application XML file. The created message definition will have fields that match the fields specified in the corresponding code attribute constructor. If the code attribute is a [DeviceMethod] code attribute, the created message will need to call a function on return that will, in turn, call the original function.

Therefore, in step 311 an interoperability (interop) function is created to execute the original function in the manner as it was declared. An interop function is used in its generic sense as a function that provides the ability for different programs to exchange data via a common set of business procedures. In this embodiment, the interop-function is used to call the exposed function in response to a received message, thereby providing interoperability between the server-side application and the wireless application. This interop function (or hop function) is generated by the wireless application development environment and placed into the wireless application code file in a similar fashion to a JavaScript wrapper on web references.

The generated interop function is assigned to the return script for the created message and is uniquely named within the project from other function names, class names, global names, built-in names, and keywords.

An example of what an inter-op function may look like is as follows:

```
Original declaration:
[DeviceMethod(message = string)]
[DialogAlert("this is my dialog text")]
function HandleMessage(message)
{
    .....
}
Generated interop function:
function GeneratedMessageName__HandleMessage( )
{
    HandleMessage(GeneratedMessageName.message);
}
```

Further, a mapping file is created and included in the bundle. In the present embodiment, the mapping file is separate from the primary mapping file for the wireless application. Alternatively, the mapping may be incorporated into the primary mapping file.

In step 312, it is determined whether or not a [RibbonAlert] code attribute was defined for the function. If a [RibbonAlert] code attribute is not defined, the build continues to step 316. If a [RibbonAlert] code attribute is defined, at step 314 the created message will have its ribbon alert type enabled.

In step 316, it is determined whether or not a [DialogAlert] code attribute was defined for the function. If a [DialogAlert] code attribute is not defined, the build continues to step 320. If a [DialogAlert] code attribute is defined, at step 318 the created message will have its dialog alert type enabled. Additionally, if the developer specified text in the constructor of the [DialogAlert], the text will be stored in the created message for the dialog alert.

In step 320, it is determined whether or not a [DeviceMethodOptions] code attribute was defined for the function. If a [DeviceMethodOptions] code attribute is not defined, the build continues to step 324. If a [DeviceMethodOptions] code attribute is defined, at step 322 the created message will have its "keep last" and/or its "end-to-end security" attributes enabled.

Steps 310 to 324 are repeated until all functions with code attributes have been analysed. In step 326, the code attributes that the developer has added to the wireless application are removed as they are no longer necessary. The wireless application is then packaged and can be deployed to a server or repository.

The following as an example of the change and/or updates required to the built wireless application bundle if a device method is added to the application. Consider the following device method:

```
[DeviceMethod ( echoString = string, echoArray = string[ ] )]
function Echo( echoString, echoArray )
{
    ...
}
```

A message is added to the component application to define the expected wireless message for the device method. A suffix, in this example MDSV8PluginExtender, is added to the name of the function to keep it unique.

```
<message
  name="EchoMDSVS8PluginExtender"
  secure="false" script="EchoMDSVS8PluginExtender__Exec">
    <field name="echoString" type="string" />
    <field name="echoArray" type="string" array="true"/>
</message>
<script name="EchoMDSVS8PluginExtender__Exec" />
```

The above script name identifies the script stub generated as the interop function. As described, the interop function calls the exposed script with the proper parameters.

```
function EchoMDSVS8PluginExtender__Exec( )
{
    Echo(
        EchoMDSVS8PluginExtender.echoString,
```

-continued

```
        EchoMDSVS8PluginExtender.echoArray);
    }
```

A mapping file is created:

```
<?xml version="1.0" encoding="UTF-8"?>
<map:wiclet xmlns:map="http://com.rim.wica/mapping.xsd
    xmlns:tns="http://tempuri.org/"
    map:compatibilityVersion="1.0.1">
    <map:component map:mapName="Echo" map:mapType="message"
    map:name="Echo">
        <map:field map:mapName="echoString" map:mapType="element"
            map:name="echoString"/>
        <map:field map:mapName="echoArray" map:mapType="element"
            map:name="echoArray"/>
    </map:component>
</map:wiclet>
```

A line is added to the mappings index to identify the newly created mapping file: ROOT_=rim.device.methods/rim-.device.methods.map (where  is a unique identifier)

Building Server Side Application

Figure 4:
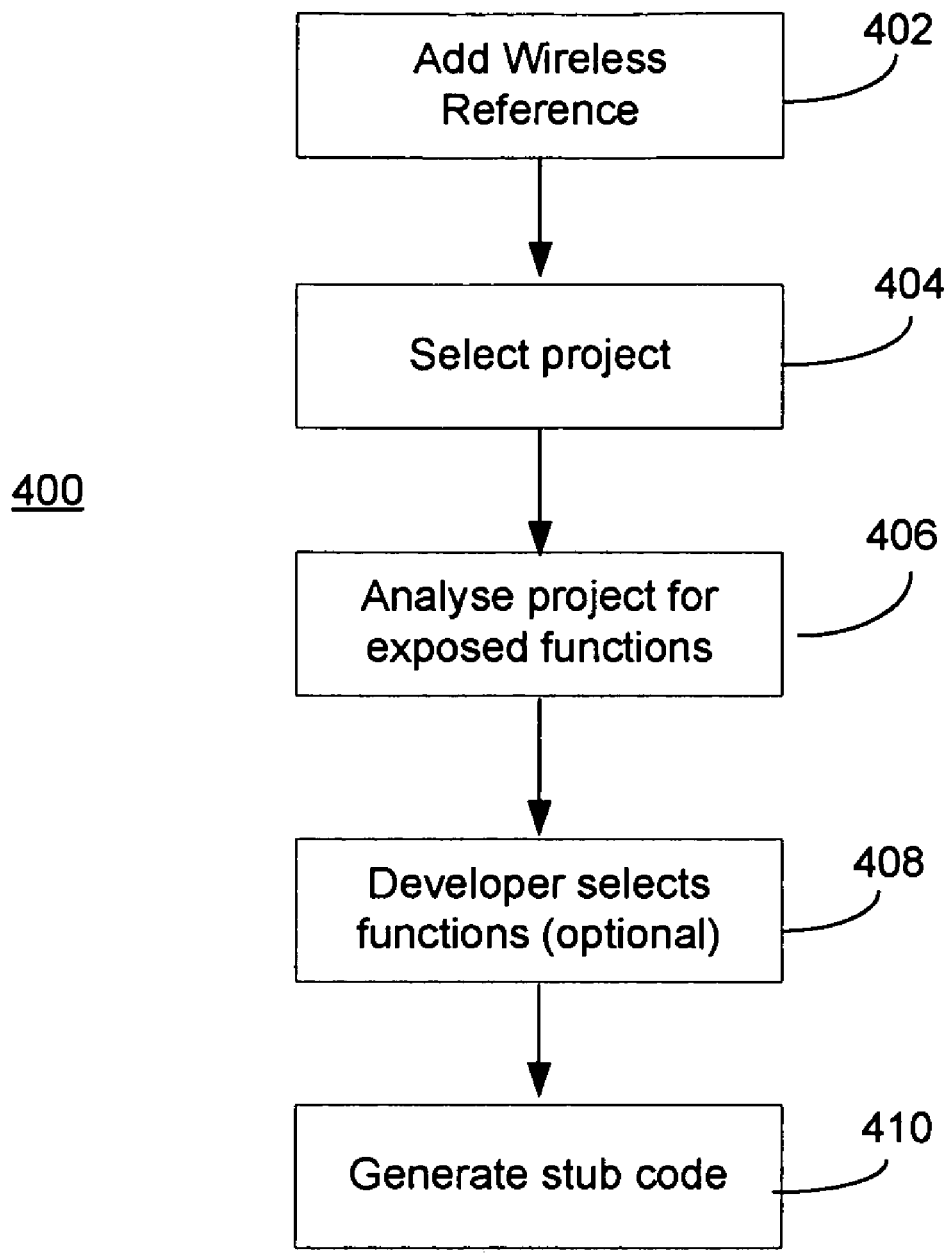
FIG. 4 is a flow chart illustrating the generation of a server-side application capable of executing a message push to a wireless application.
Figure 5:
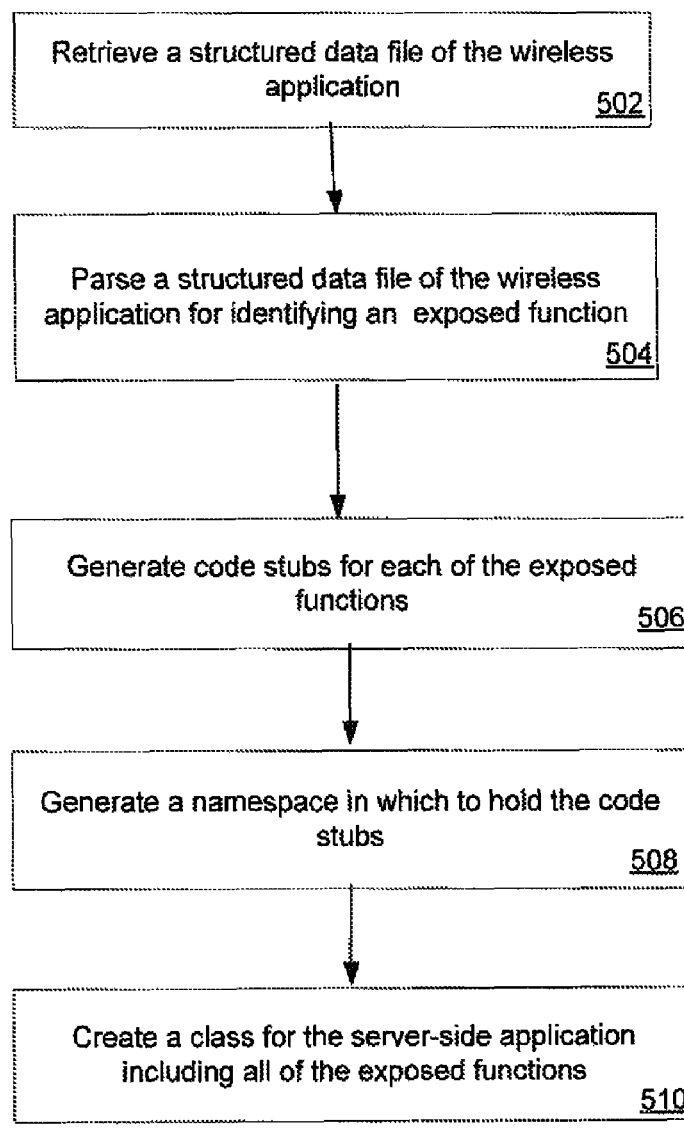
FIG. 5 is a flow chart illustrating method steps in one embodiment, for facilitating generation of a server-side application capable of calling a function of a wireless application on a mobile device.

Referring to FIG. 4, a flow chart illustrating the process of adding a reference to a wireless application into the server-side application is shown generally by numeral 400. In the application development environment for the server-side application, a context menu item "Add Wireless Reference . . . " is added to the existing project context menu to allow the developer to add a wireless application as a reference.

Accordingly, in step 402, the developer selects the "Add Wireless Reference . . . " option from the context menu. In response to this selection the developer is presented with an application wizard. In this context, an application wizard is used in its generic context to refer to a user interface element where the user is led through a sequence of dialogs. The application wizard is implemented as a plug-in to the server-side application development environment. In step 404, the developer can either select a project in the existing solution or browse to a project file.

In step 406, once the developer has selected the project to add as a reference, the application wizard interrogates the project and presents the exposed functions to the developer. As described above, the developer will be able to call these functions from the server-side application.

In step 410 the application wizard generates stub code that can then be used by the developer. The implementation language of the code stubs generated will be based on the language of the project to which the developer requested to add the wireless reference. The following will described the generation of code stubs for C# and Visual Basic for ease of explanation only. C# and Visual Basic are example of .NET Framework programming languages. .NET is a software component that can be added to or is included with the Microsoft Windows operating system. It provides a large body of pre-coded solutions to common program requirements, and manages the execution of programs written specifically for the framework.

First a namespace is generated in which to hold the code stubs. In the present embodiment, the name of the namespace is the combination of the existing project's default namespace plus the name that the developer gave the wireless reference on discovery. For example, if the project's default namespace is "WindowsApplication1", then the generated namespace generated will WindowsApplication1.referencename. All classes generated will be in this namespace.

For each class that is discovered by the application wizard a .NET class is generated in the default language that has the same properties as the discovered class. Proper get/set methods are added for the properties in the code generation. Each class generated has the proper serializable code attribute [System.SerializableAttribute( )] assigned to it.

Each property for the discovered class will be serialized in the proper order by placing [System.Xml.Serialization.XmlElementAttribute("df_string", Order=0)] code attributes on them.

Class prototyping is also enforced on the classes discovered for generation. If a class inherits from another class, this code relationship will be defined in the proper language syntax.

After the classes have been defined, the code generation creates a single class for the discovered project based on the name of the discovered project. For exemplary purposes only, it is assumed that the name of the discovered project is "Device". This class will contain all of the functions exposed by the discovered project.

Table 1 below summarizes the public properties exposed by the Device class. All values listed can be modified, but certain properties will be automatically configured.

| | |
|---|---|
| bool AllowAutoRedirect | Specifies if the HTTP request used to submit the push will allow redirects. Default - true. |
| string Url | Specifies the (Uniform Resource Locator) URL of the push listener (application gateway). |
| System.Net.ICredentials Credentials | ICredentials object that allows authentication to be passed to the push listener URL (optional). |
| string AppUri | Uniform Resource Indicator (URI) of the wireless application. Default value discovered from wireless reference. |
| string Version | Version of the wireless application. Default value discovered from wireless reference. |
| string Locale | Locale of the wireless application. Default value discovered from wireless reference. |
| StringCollection Recipients | A collection of recipients to push to. This list is empty by default. |

It should be noted that in the present embodiment, in order to push the message to the gateway 106 and then to the mobile device 102, the following two combinations are valid for sending information: application URI, plus Personal Identification Number(s) (PINs); or application URI, Locale and Version.

If neither of these two combinations is met, an exception will be thrown advising the developer that the push information is incomplete. Also, in the present embodiment, the URI/PIN combination takes precedence. That is, for example, if the developer specifies a set of PINs, an application URI and a version, the push message would go through without error to the specified PINs and URI, however the version information would be ignored.

Given the above set of rules, when a user initially generates a wireless reference, the generated code is automatically configured to send to all devices with the discovered application URI, version and locale. If a non-empty list of recipients is present during the push in the form of a PIN list, the PIN list, along with the application URI, will be used to provide a narrower group of devices.

Furthermore, when pushing to a specific URI and set of PINs, if one of the PINs in the set does not have the application provisioned on the device, an exception will be returned.

For each response message found, that is those generated by a [DeviceMethod] code attribute, a method will be created in the Device class. Each field of the message will be created as a method parameter.

Each generated method creates a key value pair of name and object that will contain the parameter name and object provided to the function. This key value pair will be then sent to a private generic execution method that will take the list of parameters, and the name of the method to execute. This generic execution method transforms the parameters and name into XML that is suitable for the application gateway 106 to perform its transformation. The data is transmitted to the application gateway 106 via an HTTP POST call using the provided properties of the Device class.

Upon invoking a push, there are two scenarios. If the push is successful, the call to invoke the push will return (void signature). If the push is unsuccessful a PushRuntimeException will be thrown which will contain the HTTP status code and description of the failure. The PushRuntimeException is a class that will be packaged as part of the DLL given to the developer to use push functionality.

When all code stubs have been successfully generated, the newly created stubs are added as a file to the existing project. This file's extension will be based on the project type. For example, C# it will be ".cs" and for Visual Basic it will be ".vb". The name of the file should be based on the name of the wireless reference name given by the developer. The file will then be added as a project item to the calling project.

The following code section illustrates how a code stub can be used to access a function on the mobile device.

```
/* DoPushCustomer is a message exposed on a wireless application either
as a Response message to a web service or a function marked with a
device method code attribute. devicehost was the name given to the
Wireless Reference */
devicehost.Device dev = new WindowsApplication1.devicehost.Device( );
dev.Url = "http://myaglocation/myagservice";
devicehost.Customer cust = new devicehost.Customer( );
cust.FirstName = "Tim";
cust.LastName = "Neil";
dev.DoPushCustomer(cust);
```

Referring once again to FIG. 4, optional step 408 provides the developer with the ability to select exposed functions that are desired for use with the server-side application. Accordingly, code stub generation is only required for the selected exposed functions.

From the disclosure above, it will be appreciate that the developer of a server-side application is provided with the ability to remotely execute a function of a wireless application executing on a mobile device by pushing data thereto. The server-side application development environment automates the generation of code stubs based on functions exposed by the wireless application as well. The server-side application development environment also automates the encapsulation of the data so that it can be pushed to the application gateway without requiring that the developer have knowledge of the transport protocol.

Although preferred embodiments of the invention have been described herein, it will be understood by those skilled in the art that variations may be made thereto without departing from the spirit of the invention or the scope of the appended claims.

The invention claimed is:

1. A method for facilitating generation of a server-side application capable of calling a function of a wireless application on a mobile device, the method comprising the steps of:

retrieving a structured data file defining the wireless application;

parsing the structured data file for identifying exposed functions;

generating code stubs for each of the exposed functions, the code stubs configured to be included as part of the server-side application and to define a message to be transmitted to the wireless application upon execution of the code stub, generating a namespace in which to hold the code stubs; and creating a class for the server-side application including all of the exposed functions, wherein the class includes a plurality of user definable public properties, the public properties including at least one of:

an automatic redirect property configured to determine whether or not redirection of the message is permitted;

a uniform resource locator (URL) configured to identify the location of a gateway server;

a uniform resource identifier (URI) configured to identify the wireless application;

a version identifier configured to identify a version of the wireless application;

a locale identifier configured to identify a locale of the wireless application;

a recipient list configured to identify a plurality of recipient mobile devices; or credentials configured to provide authentication of the server-side application.

2. The method of claim 1, wherein the wireless application to receive the message are identified by the URI, Locale and version properties on the generated class.

3. The method of claim 1, wherein the wireless application to receive the message are identified by the URI and personal identification numbers of specific devices in the recipient list.

* * * * *